May 22, 1923.  1,455,849
J. G. MUELLER ET AL
LUBRICATING CUP
Filed May 31, 1921
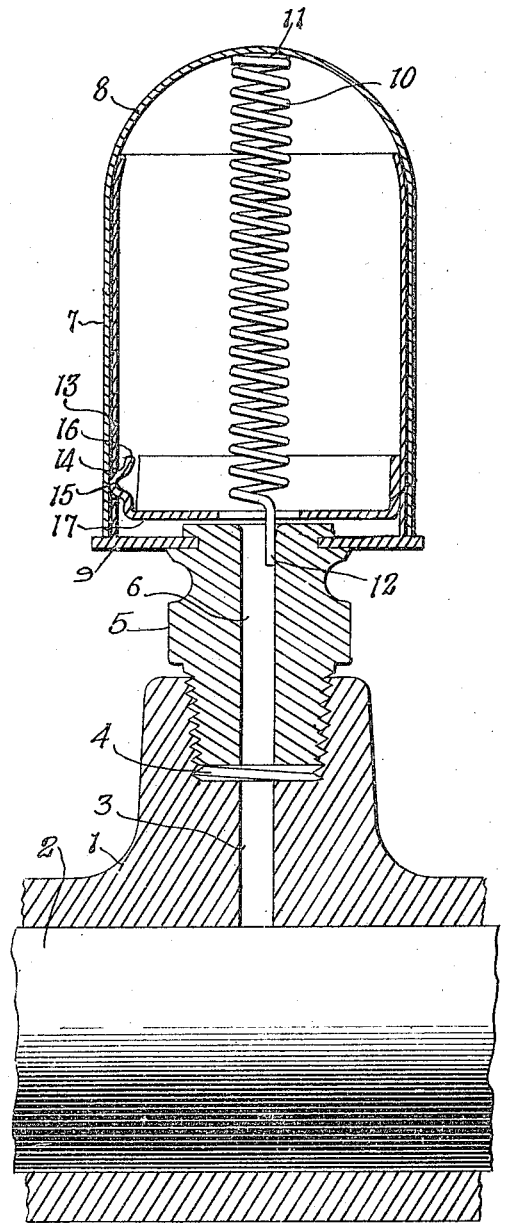
INVENTORS
John G. Mueller,
Carl A. Granzow,
Henry M. Granzow
By Toulmin & Toulmin
ATTORNEYS Patented May 22, 1923.

1,455,849

UNITED STATES PATENT OFFICE.

JOHN G. MUELLER, CARL A. GRANZOW, AND HENRY M. GRANZOW, OF DAYTON, OHIO.

LUBRICATING CUP.

Application filed May 31, 1921. Serial No. 473,616.

*To all whom it may concern:*

Be it known that we, JOHN G. MUELLER, CARL A. GRANZOW, and HENRY M. GRANZOW, citizens of the United States, residing at Dayton, in the county of Montgomery and State of Ohio, have invented certain new and useful Improvements in Lubricating Cups, of which the following is a specification, reference being had therein to the accompanying drawing.

This invention relates to improvements in lubricating cups designed for application to journal bearings for delivering oil or lubricant to the journals operating in such bearings.

The general object in view is that of providing an air-tight oil cup which will exclude atmospheric pressure from the surface of the oil within the cup and from which the oil will be fed to the bearing and journal by capillary attraction.

Another object is that of providing for readily refilling the cup with oil and for cleaning the interior of the cup.

These several ends and other objects which are incident thereto are fully carried out by the construction and arrangement hereinafter described and fully shown in the drawings.

In the accompanying drawings;

The figure is a vertical sectional view of our improved lubricating cup and of a journal bearing with a shaft or journal in the bearing, in elevation;

In the drawings, the numeral 1 designates a journal bearing of any ordinary or approved type in which may be mounted a journal or shaft 2. The bearing is fashioned with a lubricant passage 3 and with an enlarged recess 4 which is screw-threaded and adapted thereby to receive the lower screw-threaded end of a plug 5 forming a part of the oil cup. This plug is also provided with a similar lubricant passage designated 6. These passages which are in effect continuous or one passage will be small in practice, say usually about one-eighth of an inch, but may be varied from this diameter according to the character of the lubricant for which the cup may be specially designed, as light or heavy lubricating oil.

To this plug is attached the oil cup proper designated at 7, as shown in the several figures. The manner of obtaining access to the interior of the cup and the manner of attaching the cup to the plug vary in the several figures in respect to matters of detail. But the principle of a closed cup, which is air tight and which delivers the oil to the passage or passages is the same throughout, that of capillary attraction induced by the weight and position of the oil so that the oil flows constantly but exceedingly slowly in minute quantities to the bearing and journal between which it distributes itself again by capillary attraction notwithstanding the intimate fit between the bearing and the journal.

Referring now to the drawing we will describe the manner of obtaining access to the interior of the cup and of attaching the cup to the plug.

In this figure the cup is shown with a telescoping cover 8 which fits snugly over the outer surface of the cup and is held down on the base 9 of the cup by an interior spring 10 secured at 11 to the cap and at 12 to the plug. In this way the cap is not only easily lifted, by elongating the spring so that access to the interior of the cup may be had, but the cap is also seated so positively on the base 9 as to exclude air. To additionally effect an air tight joint between the cup and the cap, provision is made for the entrance of the oil into the narrow space between the two, capillary attraction again operating to induce the oil to fill this space, which is indicated at 13. An orifice 14 in the cup is occupied by a valve 15 which, when the cap is in place, is forced slightly inward to barely open the orifice and which, when the cap is removed, springs outward and firmly seats itself in the orifice to keep the oil from dripping out, as when the cup has been refilled and before the cap is adjusted into position. This valve is preferably struck up in the margin 16 of the cup bottom 17, the joint between this bottom and the cup being oil tight except at the point where the valve is formed.

The base 9 of the cup is soldered or otherwise conveniently secured to the plug.

Having thus fully described our invention, what we claim as new and desire to secure by Letters Patent, is:—

1. A lubricating device comprising an air tight cup having an oil orifice, a valve to control said orifice and a cover adapted to fit over the cup and to act on the valve to permit oil in the cup to flow between the cup and cover.

2. A lubricating device comprising an air tight cup having an oil orifice, and a cover adapted to fit over the cup and to act on the valve to permit oil in the cup to flow between the cup and cover.

In testimony whereof, we affix our signatures.

JOHN G. MUELLER.
CARL A. GRANZOW.
HENRY M. GRANZOW.